United States Patent [19]
White

[11] 4,112,479
[45] Sep. 5, 1978

[54] SYNCHRONIZING CONTROL SYSTEM

[76] Inventor: Robert I. White, 20 N. Main, Deerfield, Wis. 53531

[21] Appl. No.: 761,791

[22] Filed: Jan. 24, 1977

Related U.S. Application Data

[63] Continuation of Ser. No. 422,961, Dec. 7, 1973, abandoned.

[51] Int. Cl.² .............................................. H01H 47/00
[52] U.S. Cl. ..................................................... 361/243
[58] Field of Search ......................................... 361/243

[56] References Cited
U.S. PATENT DOCUMENTS 3,064,173  11/1962  Breen et al. .......................... 361/243

Primary Examiner—Gerald Goldberg

[57] ABSTRACT

A resolver having two inputs, one from a master pulse source and the other from a controlled device, and representative of the speed of that device is constituted by an up/down counter. An output is taken from the counter to provide a threshold so that when the counter is counting above that threshold a first output signal is derived which may be full on, and when the counter is counting below the threshold a second output is derived which may be full off. When the resolver is operating in normal steady state, the counter is counting up and down about the threshold, with the output alternating between full on and full off each time period.

4 Claims, 4 Drawing Figures

SYNCHRONIZING CONTROL SYSTEM

This is a continuation of application Ser. No. 422,961, filed Dec. 7, 1973, now abandoned.

BACKGROUND OF THE INVENTION

This invention relates generally to improvements in control systems. More particularly, it relates to improvements in control systems for maintaining two or more otherwise independent devices in speed synchronism with each other.

In U.S. patent application Ser. No. 217,925, filed on Jan. 14, 1972, by Robert I. White and assigned to the same assignee as is this application, there is disclosed a synchronizing control system which utilizes a pulse resolver to provide an output proportional to the phase relationship of a pulse derived from a master pulse source and a pulse derived from a slave device and representative of the actual speed of the slave device. In that application the particular advantages and utility of such a device in connection with sound motion picture apparatus is disclosed.

It has been found that the performance, and, therefore, the utility of the apparatus disclosed in application Ser. No. 217,925 can be considerably enhanced by the provision of a means which can accommodate to the differences in the time required for a given master device and a given slave device to go from zero to steady state or operating speed. That is to say, that where any given camera or a projector is being synchronized with any given tape recorder or other device, the electrical and mechanical characteristics of the devices so synchronized may be so different that one reaches operating or steady state speed at some time prior or subsequent to this condition being achieved by the other device, and a permanent out of sync condition may then be maintained by the resolver.

Also, due to a temporary film jam a camera slave to a recorder may lose a frame or two, and although there may be apparent speed synchronism there will be no real synchronism between the film and the sound.

Therefore, it is an object of this invention to provide a novel synchronizing system which is capable of recognizing that one device is considerably out of synchronism with another device and to provide a control signal effective to control the slave device in such a way as to insure first the acheivement of synchronism and then the maintenance of synchronism.

It is another object of this invention to provide a novel synchronizing control system wherein a slave device may lead or lag a master by a number of time periods but which provides a memory of the number of pulses lost or gained and corrects for the resulting error.

SUMMARY OF THE INVENTION

Briefly, the foregoing and other objects of the invention are achieved by providing a pulse resolver utilizing an up/down counter and deriving an output signal from the high-order stage of the counter so as to provide a zero output when the counter is counting above a threshold and a full-on output when counting below the threshold, and to provide a steady state alternating output when the counter is counting back and forth across the threshold.

BRIEF DESCRIPTION OF THE DRAWINGS

The invention itself is set forth in the claims appended hereto and forming a part of this application. While an understanding of an embodiment thereof may be had by reference to the detailed description taken in conjunction with the drawing in which:

DETAILED DESCRIPTION

Figure 1:
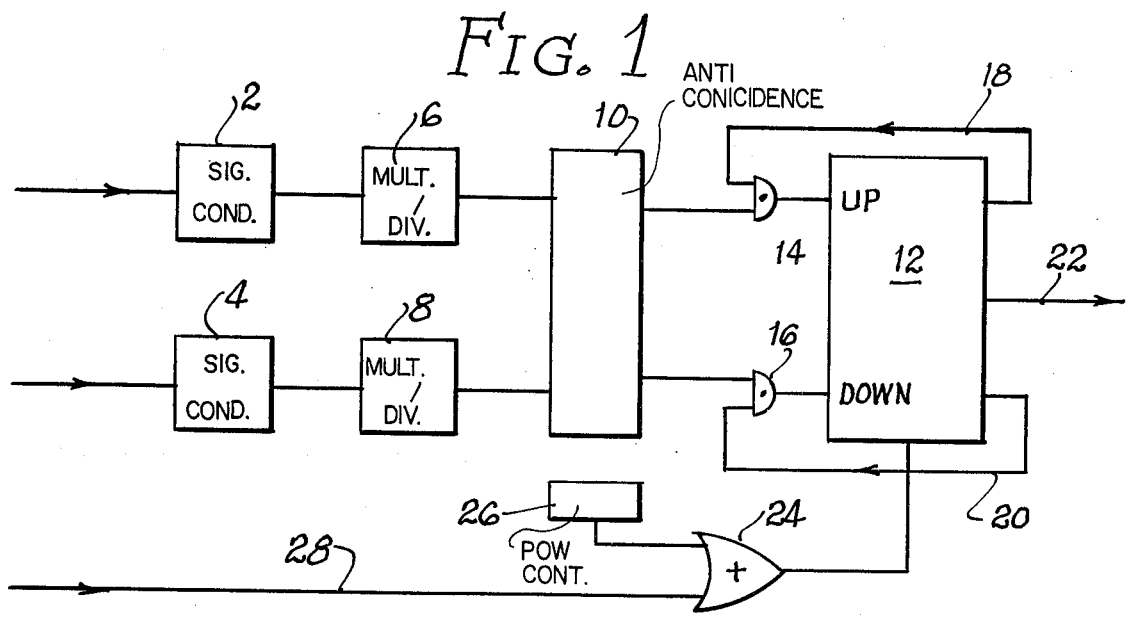
FIG. 1 is a block diagram of an embodiment of the invention.

FIG. 1 illustrates a resolver in accordance with the invention. Such a resolver may be used in a synchronizing control system such as are illustrated in FIGS. 1 and 2 of U.S. patent application Ser. No. 217,925. It should be understood, however, that this reference is by way of exemplification only, for resolvers in accordance with the invention may find utility in synchronizing control systems other than that shown in that patent application.

The resolver of FIG. 1 includes a pair of signal conditioners 2 and 4. The input terminal of one of the conditioners is to be connected to a source of master synchronizing pulses while the input terminal of the other conditioner is to be connected to a source of feedback pulses representative of the speed or other parameter of a slave device which is to be synchronized with the master pulses. The signal conditioners have for their function shaping their respective input signals into a desired configuration and, if necessary, may include an amplification stage, noise elimination circuitry and means such as a Schmitt trigger for producing a square wave output.

In order that synchronization signals that differ in frequency may be accommodated a pair of multiplier/dividers 6 and 8 may be provided. For example, suppose that the master synchronization signal is at 60 Hz and the slave synchronization pulse is 48 Hz the multiplier/divider 6 would then multiply its input signal by 2 and divide it by 5. At the same time the multiplier/divider 8 would multiply its input signal by 1 and divide it by 2. The output of each multiplier/divider 6 and 8 then would have a frequency of 24 Hz. If desired, an anticoincidence circuit 10 may be provided to receive the outputs of the multiplier/dividers 6 and 8. Such circuitry could be constituted by any means providing a delay between signals occurring simultaneously at the outputs 6 and 8. Where edge-trigger logic is used the probability of two fast-rise time edges becoming coincident is extremely low and the anticoincidence circuit 10 may not be necessary, especially as pulses will be nowhere near coincidence during steady state operation.

Element 12 is an up/down counter which, in the arrangement illustrated, is incremented by pulses derived from the master synchronizing signals and decremented by slave synchronizing signals. AND gate 14 couples the master pulses to the up counting terminal of the counter 12 while AND gate 16 supplies the slave pulses to the down counting terminal of that counter. Another input to the AND gate 14 is derived via 18 from binary outputs of the counter 12 while another input to the gate 16 is derived via 20 from binary outputs of that counter. Thus, for either of the gates 14 or 16 to supply incrementing or decrementing pulses to the counter, the gates 14 and 16 must be enabled, respectively. This is to prevent the counter from overflowing or underflowing. If the counter 12 were a 4 bit counter gate 14 would become disabled by the output on the line 18 if the counter reached its maximum limit of 15, similarly gate 16 would become disabled by the line 20 if the counter reached its minimum limit of zero.

The counter 12 is a multi-stage counter which may include any number of stages as desired by a designer. For instance, if a 4 bit counter is used its capacity is 16, that is, the range of the counter is from 0 to 15, inclusive. An output 22 may be derived from the high-order stage of the counter to establish a threshold value at mid-range. Thus, in a 4 bit counter steady state operation would occur when counting back and forth between the 7th and 8th count states. At steady state operation a pulse from the gate 14 will count it to up to 8, while a pulse from the gate 16 will count it down to 7 and so on. Obviously the capacity and modulus of the counter may be changed and the threshold value varied as determined by a designer.

The output of an OR gate 24 may be connected to the reset terminal of the counter so as to provide that the counter be reset to its starting point (count 7 for the 4 bit example) whenever power is turned on as indicated by the block 26 or by means of an external reset signal via the line 28.

Figure 2A:
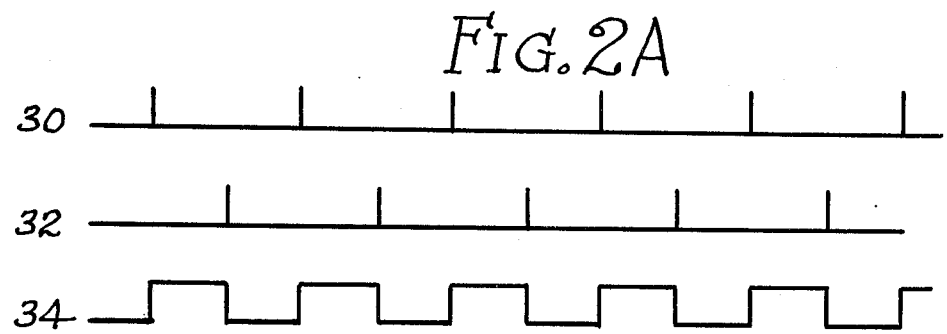
FIGS. 2A, 2B and 2C are timing diagrams illustrating an apparatus in accordance with the invention operates under varying conditions.
Figure 2B:
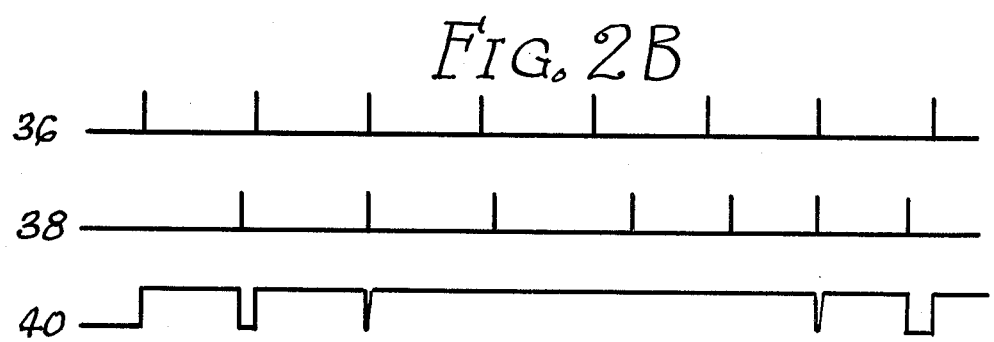
Figure 2C:
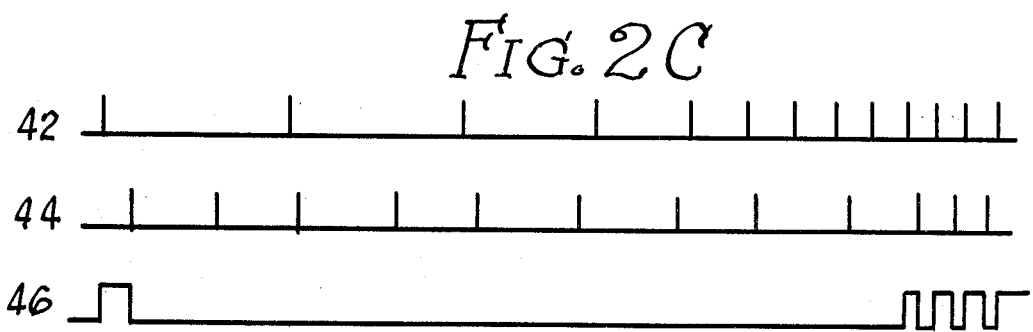

The operation of the resolver may be best understood by reference to FIGS. 2A, 2B and 2C.

FIG. 2A represents the steady state operation of the resolver wherein the wave form 30 represents the master pulses supplied via the gate 14, the wave form 32 represents the slave pulses pulses supplied via the gate 16, and wherein the output 22 is represented by the wave form 34. If the counter 12 is a 4 bit counter and the threshold is selected to be that between count 8 and count 7 it may be seen that the circuit will operate to provide a high output as shown in the wave form 34 when the count 8 is present as shown by pulse in the wave form 30. A low level output is provided on 22 when the count is decremented to 7 as may be seen by comparing wave forms 32 and 34. In the mode of operation illustrated by FIG. 2A the slave pulses lag the master pulses by about half a time period. Should the lag increase the percentage time of high level output signal present would be higher, and, of course, the opposite result would be obtained if the lag were to decrease. The percent of high-level time is a measure of the error correction power being delivered to the slave device, and also is an indication of the phase angle between the master and slave pulses. It is not necessary that the resolver maintain 0 phase angle for it has been found that a more stable operation results when there is a non-critical difference in phase angle, particularly when the resolver is used in conjunction with cameras, projectors, recorders and the like.

FIG. 2B illustrates the wave forms which occur when the slave falls momentarily a period behind the master. Wave form 36 represents the master pulses while wave form 38 represents the slave pulses and wave form 40 represents the output. Considering first the extreme left-hand side of the wave forms it may be seen how the output varies between high and low when a slave pulse occurs before the next master pulse. However, if a slave pulse should be delayed more than one period of a master pulse the counter 12 is counted to 9 in the illustrated embodiment, and the next slave pulse will decrement it only to 8. Under these conditions the output remains high so as to supply full power to the slave device to cause it to speed up and it will remain high until the count is once again varying between 7 and 8 in the case of the illustrated embodiment. Thus, above the threshold value of the counter, the output remains high until the slave device achieves synchronism with the master. If "X" number of pulses are lost by the slave, "X" number of pulses must be regained by the slave before the output will return to a low level.

FIG. 2C illustrates how the resolver behaves during a possible start up situation. That is, where the master pulse slowly accelerates to a steady state frequency. Wave form 42 illustrates the master pulses, wave form 44 the slave pulses and wave form 46 the output. Under these circumstances, assume that the master device is a projector with the characteristics of slow acceleration; assume also that the slave recorder achieves sync speed plus or minus 10% (the regulation range) almost immediately. In this case the slave leads the master. The resolver attempts to retard the recorder by maintaining a low level output until an equal number of master and slave pulses have occurred. At this time the resolver assumes its steady state operation and the wave form then resembles that illustrated in FIG. 2A.

One instance wherein apparatus in accordance with the invention may be used is in the interconnection of a camera and a recorder so as to achieve fully synchronous recording through numerous start/stop cycles. Assume that the camera and the recorder have optical sync generators; assume also that the camera is the slave, the recorder's main line is connected to the camera trigger so that the recorder will deactivate the pause solenoid when the camera trigger is pushed. The power to the camera is controlled by the digital resolver of this application. When the camera trigger is pushed the recorder begins to run and through its optical sync generator generates master pulses. These cause the resolver to supply full power to the camera until it catches up with the recorder. The power is then supplied to the camera in its pulse-width modulated form as required to maintain synchronization. When the camera trigger is released both devices halt. The resolver will remember their relative positions and correct for any possible discrepancy the next time the trigger is activated.

As indicated, the capacity of the counter may be varied as desired. Other advantages are possible, depending upon the application. Thus, the threshold need not be taken from the middle of the counter. That is to say, it may be arranged to have a nonsymmetrical operating range. When a counter of sufficient capacity so as to eliminate the possibility of overflow or underflow, the gates 14 and 16 could be eliminated. Obviously also, the invention may have utility for devices other than those related to the recording media for it may be used wherever rotating machinery or linear actuators are required.

It is intended by the claims appended hereto to cover all embodiments and variations thereof as come within their scope.

What is claimed as new and desired to be secured by Letters Patent is:

1. In a speed synchronizing system comprising means for receiving master synchronizing periodic signals and means for receiving periodic pulses representative of the speed of a device to be synchronized with the master synchronizing pulses, the improvement comprising: an up/down counter having a plurality of counting states and an up count input terminal and down count input terminal; means for deriving an output from said counter based upon the count stored in said counter so as to establish a threshold value; means for supplying the master synchronizing periodic signals to one input terminal; means for supplying the speed representative synchronizing periodic pulses of the slave to the other input terminal whereby a first output is derived from said counter when the count stored in said counter is less than the threshold value and a second and different output is provided when the count stored in said counter is more than threshold value; means for connecting the output to the device to control the speed thereof; and including means for inhibiting master or slave representative pulses to said up/down counter when said counter is counted to either its upper or lower limit, respectively.

2. A speed synchronizing system as set forth in claim 1, including a first multiplier/divider for receiving the master pulses and supplying master pulses to said up/down counter at a fixed frequency, and a second multiplier/divider for receiving the representative pulses and supplying representative pulses to said up/down counter at the same fixed frequency.

3. In a speed synchronizing system comprising means for receiving master synchronizing periodic signals and means for receiving periodic pulses representative of the speed of a device to be synchronized with the master synchronizing pulses, the improvement comprising: a multistage up/down counter having a plurality of counting stages and an up count input terminal and down count input terminal; means for deriving an output from a stage of said counter between its upper and lower limits based upon the count stored in said counter so as to establish a threshold numerical value; means for supplying the master synchronizing periodic signals to one input terminal; means for supplying the speed representative synchronizing periodic pulses of the slave to the other input terminal whereby the output is at a high level when the count in said counter is more than the threshold numerical value and is a low level when the count is less than the threshold numerical value; and means for connecting the output to the device to control the speed thereof.

4. A speed synchronizing system as set forth in claim 3, including a first multiplier/divider for receiving the master pulses and supplying master pulses to said up/down counter at a fixed frequency, and a second multiplier/divider for receiving the representative pulses and supplying representative pulses to said up/down counter at the same fixed frequency.

* * * * *